United States Patent
Nowak

(10) Patent No.: US 9,836,215 B2
(45) Date of Patent: Dec. 5, 2017

(54) REAL TIME PROTOCOL GENERATION

(71) Applicant: HGST Netherlands B.V., Amersterdam (NL)

(72) Inventor: Brian T. Nowak, Byron, MN (US)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 66 days.

(21) Appl. No.: 14/548,115

(22) Filed: Nov. 19, 2014

(65) Prior Publication Data
US 2016/0139626 A1      May 19, 2016

(51) Int. Cl.
| | | |
|---|---|---|
| G06F 1/04 | (2006.01) | |
| G06F 3/06 | (2006.01) | |
| G06F 13/38 | (2006.01) | |
| G06F 13/16 | (2006.01) | |
| G06F 1/10 | (2006.01) | |

(52) U.S. Cl.
CPC ............ *G06F 3/06* (2013.01); *G06F 13/1694* (2013.01); *G06F 13/38* (2013.01); *G06F 1/10* (2013.01)

(58) Field of Classification Search
CPC .................................... G06F 1/12; G06F 1/14
USPC ........................................................ 713/500
See application file for complete search history.

(56) References Cited

U.S. PATENT DOCUMENTS

| | | | | |
|---|---|---|---|---|
| 5,619,662 A * | 4/1997 | Steely, Jr. | ............. | G06F 9/3012 712/216 |
| 6,526,484 B1 * | 2/2003 | Stacovsky | ........... | G06F 13/1626 710/39 |
| 6,539,440 B1 * | 3/2003 | Stracovsky | ........... | G06F 13/161 710/20 |
| 6,567,862 B1 * | 5/2003 | Saito | ..................... | G06F 3/0613 348/E5.008 |
| 7,920,431 B2 | 4/2011 | Nobunaga et al. | | |
| 8,243,516 B2 | 8/2012 | Redaelli et al. | | |
| 8,261,008 B2 | 9/2012 | Que | | |

(Continued)

FOREIGN PATENT DOCUMENTS

WO        2014026572 A1      2/2014

OTHER PUBLICATIONS

"Open NAND Flash Interface Specification," Hynix Semiconductor et al., Revision 3.0, Mar. 9, 2011, 288 pp.

*Primary Examiner* — Jaweed A Abbaszadeh
*Assistant Examiner* — Volvick Derose
(74) *Attorney, Agent, or Firm* — Patterson & Sheridan, LLP

(57) ABSTRACT

A storage device may include a memory; and a controller. The controller may be configured to: maintain, for each respective type of command segment of a plurality of types of command segments, a respective timer of a plurality of timers that indicates an amount of time elapsed since the controller last output a command segment of the respective type of command segments to the memory; determine, based on the plurality of timers, whether a command segment of a particular type of command segment of the plurality of types of command segments may be output to the memory at a current time; and responsive to determining that the command segment of the particular type of command segment may be output at the current time, permit output of the command segment of the particular type of command segment to the memory at the current time.

24 Claims, 6 Drawing Sheets

(56) References Cited

U.S. PATENT DOCUMENTS

| | | | |
|---|---|---|---|
| 8,499,201 B1* | 7/2013 | Chiu | G06F 11/3037 |
| | | | 714/42 |
| 8,743,613 B2 | 6/2014 | Wang et al. | |
| 2003/0167386 A1* | 9/2003 | Kuo | G06F 13/1631 |
| | | | 711/220 |
| 2004/0059954 A1* | 3/2004 | Hoehler | G06F 1/3225 |
| | | | 713/300 |
| 2005/0132145 A1* | 6/2005 | Dybsetter | G06T 1/60 |
| | | | 711/150 |
| 2005/0246481 A1* | 11/2005 | Rohit | G06F 13/161 |
| | | | 711/105 |
| 2006/0041730 A1* | 2/2006 | Larson | G06F 13/4243 |
| | | | 711/167 |
| 2007/0118682 A1 | 5/2007 | Zhang et al. | |
| 2008/0114960 A1* | 5/2008 | Huang | G06F 13/4243 |
| | | | 711/167 |
| 2010/0091537 A1* | 4/2010 | Best | G11C 5/02 |
| | | | 365/51 |
| 2013/0265825 A1 | 10/2013 | Lassa | |
| 2014/0032939 A1* | 1/2014 | Jeddeloh | G06F 1/3234 |
| | | | 713/300 |
| 2014/0082228 A1* | 3/2014 | Kalemkarian | G06F 11/0757 |
| | | | 710/18 |
| 2014/0325122 A1* | 10/2014 | Kim | G11C 16/00 |
| | | | 711/103 |

* cited by examiner

REAL TIME PROTOCOL GENERATION

TECHNICAL FIELD

This disclosure relates to communication protocols, and more particularly, to generating a communication protocol in real time to communicate with memory devices.

BACKGROUND

Memory devices used in computers or other electronics devices may be non-volatile memory or volatile memory. The main difference between non-volatile memory and volatile memory is that non-volatile memory may continue to store data without requiring a persistent power supply. As a result, non-volatile memory devices have developed into a popular type of memory for a wide range of electronic applications. For instance, non-volatile memory devices, including flash memory devices, are commonly incorporated into solid-state storage devices, such as solid-state drives (SSDs).

A typical SSD includes a controller that may communicate with the non-volatile flash memory via a plurality of commands in accordance with one or more interface types. Some example interface types include Asynchronous (ASYNC), Single Data Rate (SDR), Open NAND Flash Interface (ONFI) as promoted by the ONFI Working Group, TOGGLE as promoted by Toshiba Inc., Samsung Electronics Co., and Sandisk Inc., and the like. Each of the plurality of commands may correspond to one or more sequences of signals. For instance, a controller may write data to non-volatile memory using a write command that corresponds to a command cycle defined by a first sequence of signals, an address cycle defined by a second sequence of signals, and a data cycle defined by a third sequence of signals.

SUMMARY

In one example, a method includes maintaining, for each respective type of command segment of a plurality of types of command segments, a respective timer of a plurality of timers that indicates an amount of time elapsed since a controller of a data storage device last output a command segment of the respective type of command segment to a memory of the data storage device; determining, based on the plurality of timers, whether a command segment of a particular type of command segment of the plurality of types of command segments may be output to the memory at a current time; and responsive to determining that the command segment of the particular type of command segment may be output at the current time, permitting output of the command segment of the particular type of command segment to the memory at the current time.

In another example, a data storage device includes a memory; and a controller configured to: maintain, for each respective type of command segment of a plurality of types of command segments, a respective timer of a plurality of timers that indicates an amount of time elapsed since the controller last output a command segment of the respective type of command segments to the memory; determine, based on the plurality of timers, whether a command segment of a particular type of command segment of the plurality of types of command segments may be output to the memory at a current time; and responsive to determining that the command segment of the particular type of command segment may be output at the current time, permit output of the command segment of the particular type of command segment to the memory at the current time.

In another example, a computer-readable storage medium stores instructions that, when executed, cause one or more processors of a data storage device to: maintain, for each respective type of command segment of a plurality of types of command segments, a respective timer of a plurality of timers that indicates an amount of time elapsed since a controller of a data storage device last output a command segment of the respective type of command segment to a memory of the data storage device; determine, based on the plurality of timers, whether a command segment of a particular type of command segment of the plurality of types of command segments may be output to the memory at a current time; and responsive to determining that the command segment of the particular type of command segment may be output at the current time, permit output of the command segment of the particular type of command segment to the memory at the current time.

In another example, a system includes means for means for maintaining, for each respective type of command segment of a plurality of types of command segments, a respective timer of a plurality of timers that indicates an amount of time elapsed since a controller of a data storage device last output a command segment of the respective type of command segments to a memory of the data storage device; means for determining, based on the plurality of timers, whether a command segment of a particular type of command segment of the plurality of types of command segments may be output to the memory at a current time; and means for responsive to determining that the command segment of the particular type of command segment may be output at the current time, permitting output of the command segment of the particular type of command segment to the memory at the current time.

The details of one or more examples are set forth in the accompanying drawings and the description below. Other features, objects, and advantages will be apparent from the description and drawings, and from the claims.

DETAILED DESCRIPTION

Figure 1:
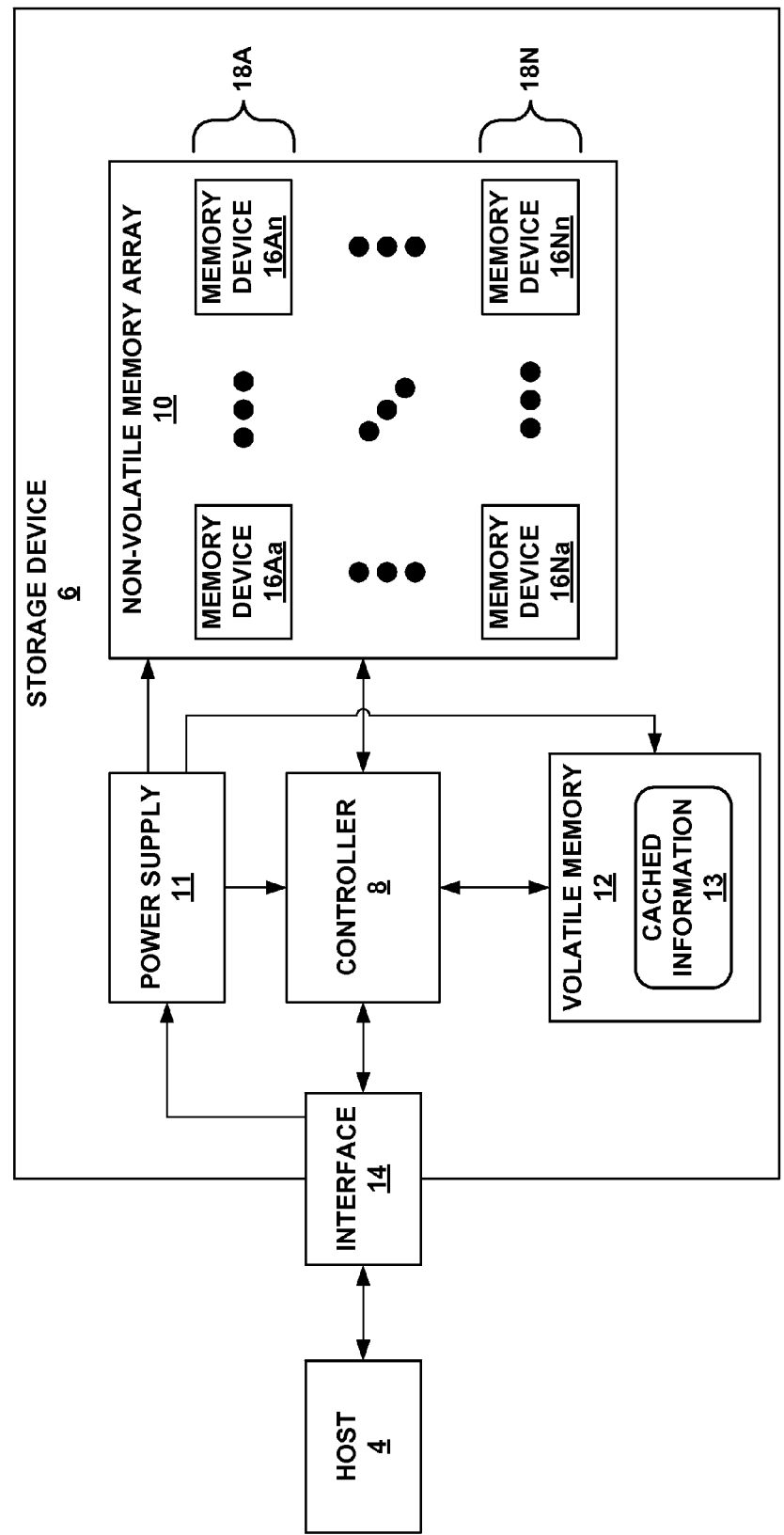
FIG. 1 is a conceptual and schematic block diagram illustrating an example storage environment in which a storage device may function as a storage device for a host device, in accordance with one or more techniques of this disclosure

In general, this disclosure describes controllers of non-volatile memory that utilize techniques for complying with signal timing requirements of the non-volatile memory by decomposing commands into a plurality of command segments and generating in real time a communication protocol that complies with the signal timing requirements on the command segment level. Some controllers may comply with the timing requirements by outputting signals in accordance with a predetermined implementation-specific communication protocol as opposed to the real time communication protocol described herein. As one example, a predetermined implementation-specific communication protocol may specify a signal timing sequence for a particular combination of interface type, manufacturer, product line, manufacturing lot, operating voltage, and operating frequency.

In some examples, the predetermined implementation-specific communication protocol may allow the controller may comply with the signal timing requirements on the command level. A timing violation may exist between sequential commands where the time between the last signal of a first command and the first signal of a second, subsequent command is less than a minimum time. A timing violation may result in a loss of data integrity, which may lead to data loss. As such, the predetermined implementation-specific communication protocol may cause the controller to implement a time delay between commands to prevent timing violations between sequential commands. For instance, after the end of a first command, the controller may wait a predetermined period of time until outputting a second command. In some examples, it may not be desirable for the controller to wait the same period of time between different combinations of types of commands, as different subsequent commands may have different timing requirements. As such, it may not be desirable for the controller to use the same delay time (i.e., to wait the same period of time) between every combinations of command types.

Because of this large number of combinations of command types, differences in the interface types used with non-volatile memory, and differences between non-volatile memory, it may be difficult to produce a predetermined implementation-specific communication protocol. For instance, where the interface between the controller and the non-volatile memory is un-clocked, timing requirements may be specified in units of time (e.g., X nanoseconds), as opposed to numbers of clock cycles (e.g., X clock cycles). As one example, a signal timing requirement may specify that signal A may not rise within five nanoseconds of signal B. In some examples, there may be a large number of signal timing requirements. For instance, the controller may have to comply with upwards of 40 signal timing requirements on the command level. Due to the large number of signal timing requirements, many hours of manual calculation and adjustment may be spent producing and/or updating a predetermined implementation-specific communication protocol. Additionally, any time a change is made to one or more of the interface type, manufacturer, product line, manufacturing lot, operating voltage, or operating frequency, the predetermined implementation-specific communication protocol may need to be generated or updated.

In accordance with one or more techniques of this disclosure, as opposed to using a predetermined implementation-specific communication protocol, a controller may generate a communication protocol in real time. In some examples, each of the types of commands may be composed of a plurality of command segments. For instance, each of the types of command segments may be some combination of a chip enable (CE) segment, a command (CMD) segment, an address (ADR) segment, a data write (DW) segment, and a data read (DR) segment. In some examples, rather than using a predetermined implementation-specific communication protocol that specifies a static timing protocol for each command and a universal delay time between commands, a controller described herein may decompose respective commands into a plurality of command segments and generate a communication protocol that complies with the signal timing requirements on the command segment level.

For example, the controller may maintain, for each respective type of command segment, a respective timer of a plurality of timers that indicates an amount of time elapsed since the controller last output a command segment of the respective type of command segments. The controller may determine, based on the plurality of timers, whether or not a command segment of a particular type of command segment may be output at a current time. In some examples, the controller may determine whether or not the command segment of the particular type of command segment may be output at the current time by comparing respective values of the plurality of timers to a respective threshold value of a plurality of threshold values. Each of the respective threshold values may indicate a respective minimum amount of time between a time at which the controller outputs a command segment of a respective type of command segment and a time at which the controller may output the particular type of command segment. The controller may maintain a plurality of respective timers for each respective command segment type. In this way, the controller may comply with the signal timing requirements on the command segment level. By generating the communication protocol in real time, the controller described herein may reduce or eliminate the need to create and/or update a predetermined implementation-specific communication protocol for each combination of interface type, manufacturer, product line, manufacturing lot, operating voltage, and operating frequency. Additionally, in some examples, by complying with the signal timing requirements on the command segment level, the controller may improve the efficiency at which the controller communicates with the non-volatile memory.

FIG. 1 is a conceptual and schematic block diagram illustrating an example storage environment 2 in which storage device 6 may function as a storage device for host device 4, in accordance with one or more techniques of this disclosure. For instance, host device 4 may utilize non-volatile memory devices included in storage device 6 to store and retrieve data. In some examples, storage environment 2 may include a plurality of storage devices, such as storage device 6, which may operate as a storage array. For instance, storage environment 2 may include a plurality of storages devices 6 configured as a redundant array of inexpensive/independent disks (RAID) that collectively function as a mass storage device for host device 4.

Storage environment 2 may include host device 4 which may store and/or retrieve data to and/or from one or more storage devices, such as storage device 6. As illustrated in FIG. 1, host device 4 may communicate with storage device 6 via interface 14. Host device 4 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

As illustrated in FIG. 1 storage device 6 may include controller 8, non-volatile memory array 10 (NVMA 10), power supply 11, volatile memory 12, and interface 14. In some examples, storage device 6 may include additional components not shown in FIG. 1 for sake of clarity. For example, storage device 6 may include a printed board (PB) to which components of storage device 6 are mechanically attached and which includes electrically conductive traces that electrically interconnect components of storage device 6, or the like. In some examples, the physical dimensions and connector configurations of storage device 6 may conform to one or more standard form factors. Some example standard form factors include, but are not limited to, 3.5" hard disk drive (HDD), 2.5" HDD, 1.8" HDD, peripheral component interconnect (PCI), PCI-extended (PCI-X), PCI Express (PCIe) (e.g., PCIe×1, ×4, ×8, ×16, PCIe Mini Card, MiniPCI, etc.). In some examples, storage device 6 may be directly coupled (e.g., directly soldered) to a motherboard of host device 4.

Storage device 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, interface 14 may operate in accordance with one or more of the following protocols: advanced technology attachment (ATA) (e.g., serial-ATA (SATA) and parallel-ATA (PATA)), Fibre Channel, small computer system interface (SCSI), serially attached SCSI (SAS), peripheral component interconnect (PCI), and PCI-express. The electrical connection of interface 14 (e.g., the data bus, the control bus, or both) is electrically connected to controller 8, providing electrical connection between host device 4 and controller 8, allowing data to be exchanged between host device 4 and controller 8. In some examples, the electrical connection of interface 14 may also permit storage device 6 to receive power from host device 4. For example, as illustrated in FIG. 1, power supply 11 may receive power from host device 4 via interface 14.

Storage device 6 may include NVMA 10, which may include a plurality of memory devices 16Aa-16Nn (collectively, "memory devices 16"). Each of memory devices 16 may be configured to store and/or retrieve data. For instance, a memory device of memory devices 16 may receive data and a message from controller 8 that instructs the memory device to store the data. Similarly, the memory device of memory devices 16 may receive a message from controller 8 that instructs the memory device to retrieve data. In some examples, each of memory devices 6 may be referred to as a die. In some examples, a single physical chip may include a plurality of dies (i.e., a plurality of memory devices 16). In some examples, each of memory devices 16 may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, memory devices 16 may include any type of non-volatile memory devices. Some examples, of memory devices 16 include, but are not limited to flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

Flash memory devices may include NAND or NOR based flash memory devices, and may store data based on a charge contained in a floating gate of a transistor for each flash memory cell. In NAND flash memory devices, the flash memory device may be divided into a plurality of blocks which may divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Controller 8 may write data to and read data from NAND flash memory devices at the page level and erase data from NAND flash memory devices at the block level.

In some examples, it may not be practical for controller 8 to be separately connected to each memory device of memory devices 16. As such, the connections between memory devices 16 and controller 8 may be multiplexed. As an example, memory devices 16 may be grouped into channels 18A-18N (collectively, "channels 18"). For instance, as illustrated in FIG. 1, memory devices 16Aa-16Nn may be grouped into first channel 18A, and memory devices 16Na-16Nn may be grouped into $N^{th}$ channel 18N. The memory devices 16 grouped into each of channels 18 may share one or more connections to controller 8. For instance, the memory devices 16 grouped into first channel 18A may be attached to a common I/O bus and a common control bus. Storage device 6 may include a common I/O bus and a common control bus for each respective channel of channels 18. In some examples, each channel of channels 18 may include a set of chip enable (CE) lines which may be used to multiplex memory devices on each channel. For example, each CE line may be connected to a respective memory device of memory devices 18. In this way, the number of separate connections between controller 8 and memory devices 18 may be reduced. Additionally, as each channel has an independent set of connections to controller 8, the reduction in connections may not significantly affect the data throughput rate as controller 8 may simultaneously issue different commands to each channel.

Storage device 6 may include power supply 11, which may provide power to one or more components of storage device 6. When operating in a standard mode, power supply 11 may provide power to the one or more components using power provided by an external device, such as host device 4. For instance, power supply 11 may provide power to the one or more components using power received from host device 4 via interface 14. In some examples, power supply 11 may include one or more power storage components configured to provide power to the one or more components when operating in a shutdown mode, such as where power ceases to be received from the external device. In this way, power supply 11 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

Storage device 6 may include volatile memory 12, which may be used by controller 8 to store information. In some examples, controller 8 may use volatile memory 12 as a cache. For instance, controller 8 may store cached information 13 in volatile memory 12 until cached information 13 is written to memory devices 16. As illustrated in FIG. 1, volatile memory 12 may consume power received from power supply 11. Examples of volatile memory 12 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like).

Storage device 6 includes controller 8, which may manage one or more operations of storage device 6. For instance, controller 8 may manage the reading of data from and/or the writing of data to memory devices 16. In some examples, controller 8 may manage the reading of data from and/or the writing of data to memory devices 16 by exchanging signals with memory devices 16. As discussed above, controller 8 may exchange signals with memory devices 16 in accordance with a communication protocol.

In accordance with one or more techniques of this disclosure, as opposed to using a predetermined implementation-specific communication protocol, controller 8 may generate a communication protocol in real time. For instance, as opposed to using a predetermined implementation-specific communication protocol that specifies a static timing protocol for each command and a universal delay time between commands, controller 8 may decompose commands into a plurality of command segments and generate a communication protocol that complies with the signal timing requirements on the command segment level. By generating the communication protocol in real time, controller 8 may eliminate the need to create and/or update a predetermined implementation-specific communication protocol for each combination of interface type, manufacturer, product line, manufacturing lot, operating voltage, and operating frequency. Additionally, in some examples, by complying with the signal timing requirements on the command segment level, controller 8 may improve the efficiency at which the controller communicates with memory devices 16. Additional details of controller 8 are discussed below with reference to FIG. 2.

Figure 2:
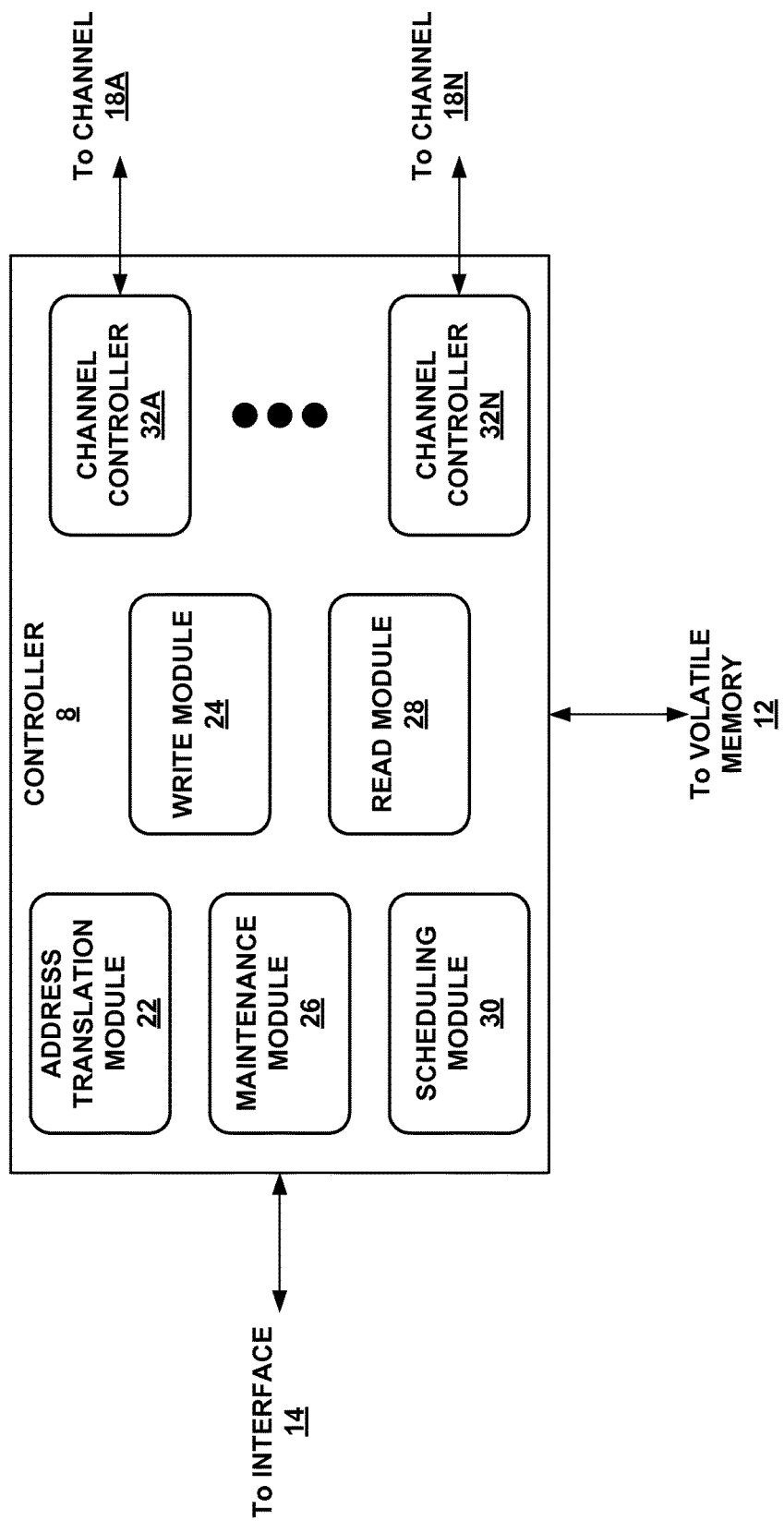
FIG. 2 is a conceptual and schematic block diagram illustrating an example controller, in accordance with one or more techniques of this disclosure.

FIG. 2 is a conceptual and schematic block diagram illustrating example details of controller 8. In some examples, controller 8 may include an address translation module 22, a write module 24, a maintenance module 26, a read module 28, a scheduling module 30, and a plurality of channel controllers 32A-32N (collectively, "channel controllers 28"). In other examples, controller 8 may include additional modules or hardware units, or may include fewer modules or hardware units. Controller 8 may include a microprocessor, digital signal processor (DSP), application specific integrated circuit (ASIC), field programmable gate array (FPGA), or other digital logic circuitry. In some examples, controller 8 may be a system on a chip (SoC).

Controller 8 may interface with host device 4 via interface 14 and manage the storage of data to and the retrieval of data from memory devices 16. For example, write module 24 of controller 8 may manage writes to memory devices 16. For example, write module 24 may receive a message from host device 4 via interface 14 instructing storage device 6 to store data associated with a logical address and the data. Write module 24 may manage writing of the data to memory devices 16.

For example, write module 24 may communicate with address translation module 22, which manages translation between logical addresses used by host device 4 to manage storage locations of data and physical block addresses used by write module 24 to direct writing of data to memory devices 16. Address translation module 22 of controller 8 may utilize a flash translation layer or table that translates logical addresses (or logical block addresses) of data stored by memory devices 16 to physical block addresses of data stored by memory devices 16. For example, host device 4 may utilize the logical block addresses of the data stored by memory devices 16 in instructions or messages to storage device 6, while write module 24 utilizes physical block addresses of the data to control writing of data to memory devices 16. (Similarly, read module 28 may utilize physical block addresses to control reading of data from memory devices 16.) The physical block addresses correspond to actual, physical blocks of memory devices 16. In some examples, address translation module 22 may store the flash translation layer or table in volatile memory 12, such as within cached information 13 stored by volatile memory 12.

In this way, host device 4 may be allowed to use a static logical block address for a certain set of data, while the physical block address at which the data is actually stored may change. Address translation module 22 may maintain the flash translation layer or table to map the logical block addresses to physical block addresses to allow use of the static logical block address by the host device 4 while the physical block address of the data may change, e.g., due to wear leveling, garbage collection, or the like.

As discussed above, write module 24 of controller 8 may perform one or more operations to manage the writing of data to memory devices 16. For example, write module 24 may manage the writing of data to memory devices 16 by selecting one or more blocks within memory devices 16 to store the data and causing memory devices of memory devices 16 that include the selected blocks to actually store the data. As discussed above, write module 24 may cause address translation module 22 to update the flash translation layer or table based on the selected blocks. For instance, write module 24 may receive a message from host device 4 that includes a unit of data and a logical block address, select a block within a particular memory device of memory devices 16 to store the data, cause the particular memory device of memory devices 16 to actually store the data (e.g., via a channel controller of channel controllers 32 that corresponds to the particular memory device), and cause address translation module 22 to update the flash translation layer or table to indicate that the logical block address corresponds to the selected block within the particular memory device.

Each channel controller of channel controllers 32 may be connected to a respective channel of channels 18. In some examples, controller 8 may include the same number of channel controllers 32 as the number of channels 18 of storage device 2. Channel controllers 32 may perform the intimate control of addressing, programming, erasing, and reading of memory devices 16 connected to respective channels, e.g., under control of write module 24, read module 28, and/or maintenance module 26.

Maintenance module 26 may be configured to perform operations related to maintaining performance and extending the useful life of storage device 6 (e.g., memory devices 16). For example, maintenance module 26 may implement at least one of wear leveling or garbage collection.

Scheduling module 30 of controller 8 may schedule operations to be performed by memory devices 16. For instance, scheduling module 30 may cause one or more of memory devices 16 to perform one or more operations based on requests received from other components of controller 8. In some examples, scheduling module 30 may cause a particular memory device of memory devices 16 to perform one or more operations by causing a channel controller corresponding to the particular memory device to output commands to the particular memory device. As one example, scheduling module 30 may permit channel controller 32A to output commands that cause memory device 16Aa to store data.

In some examples, each of the commands may be composed of a plurality of types of command segments. As discussed above and in accordance with one or more techniques of this disclosure, scheduling module 30 may decompose the commands into a plurality of command segments. In some examples, each segment of the plurality of command segments may be a type of command segment. Some example types of command segments include, but are not limited to a chip enable (CE) segment, a command (CMD) segment, an address (ADR) segment, a data write (DW) segment, and a data read (DR) segment. Additional details of scheduling module 30 are discussed below with reference to FIG. 3.

Figure 3:
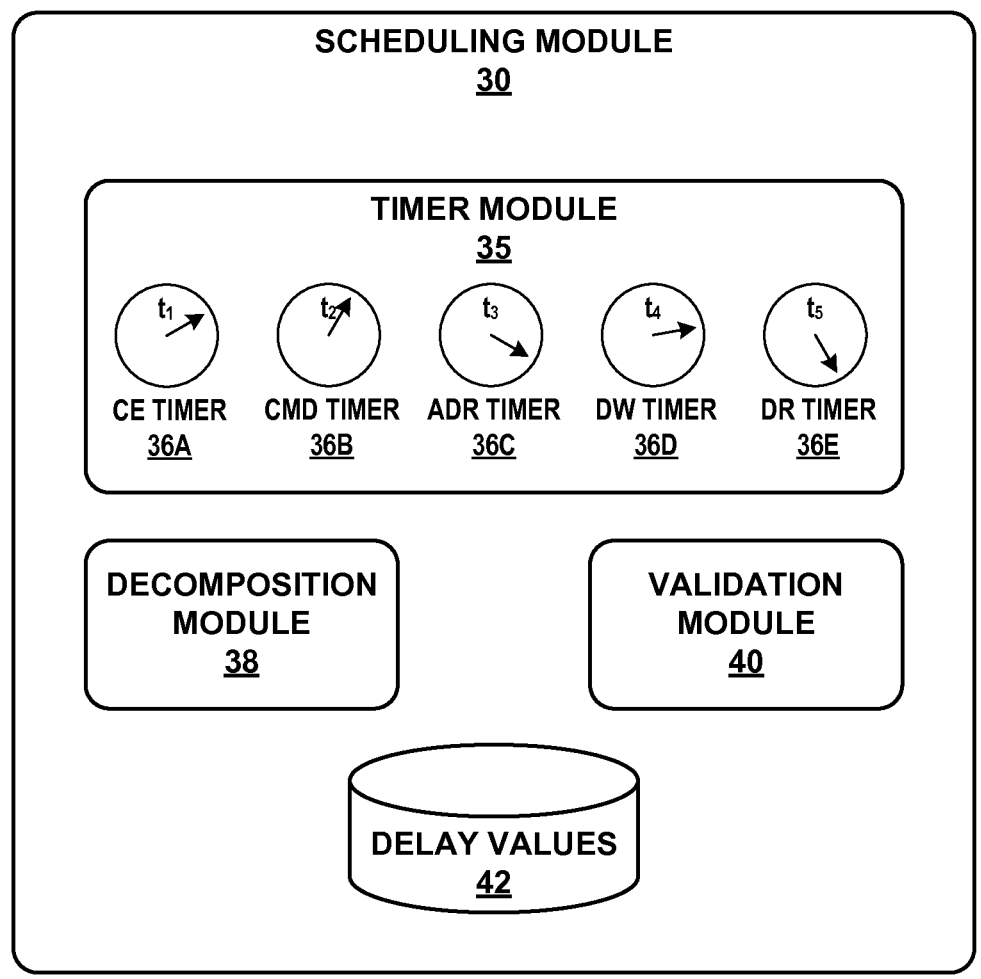
FIG. 3 is a conceptual and schematic block diagram illustrating example details of scheduling module, in accordance with one or more techniques of this disclosure.

FIG. 3 is a conceptual and schematic block diagram illustrating example details of scheduling module 30. In some examples, scheduling module 30 may include timer module 35, decomposition module 38, validation module 40, and delay values 42. In other examples, scheduling module 30 may include additional modules, or may include fewer modules.

In some examples, scheduling module 30 may include timer module 35 which may be configured to maintain a plurality of timers. For instance, timer module 35 may maintain respective timers 36A-36E (collectively, "timers 36") which may each indicate an amount of time elapsed since controller 8 last output a command segment of a respective type of command segment to one or more of memory devices 16. As one example, CE timer 36A may indicate an amount of time elapsed since controller 8 last output a CE type command segment to one or more of memory devices 16. As another example, ADR timer 36C may indicate an amount of time elapsed since controller 8 last output an ADR type command segment to one or more of memory devices 16.

In some examples, each of timers 36 may indicate the respective amount of time elapsed in clock cycles (i.e., of a clock of controller 8). For instance, timer module 35 may maintain each respective timer of timers 36 as digital timer (e.g., an eight-bit digital timer) that indicates a number of clock cycles elapsed since controller 8 last output a command segment of a respective type of command segment to one or more of memory devices 16.

In some examples, timer module 35 may be configured to reset a particular timer of timers 36 in response to determining or receiving an indication that controller 8 outputted a command segment of a type of command segment that corresponds to the particular timer of timers 36. In some examples, timer module 35 may be configured to reset a particular timer of timers 36 in response to determining that validation module 40 permitted output of a command segment of a type of command segments that corresponds to the particular timer of timers 36.

In some examples, timer module 35 may maintain a separate set of timers 36 for each channel of channels 18. For instance, timer module 35 may maintain a first set of timers 36 for first channel 18A, a second set of timers 36 for second channel 18B, and an $N^{th}$ set of timers 36 for $N^{th}$ channel 18N. In any case, timer module 35 may output the values of timers 36 to one or more other components of scheduling module 30, such as validation module 40.

In some examples, scheduling module 30 may include decomposition module 38, which may be configured to decompose commands, such as commands to be output to memory devices 16, into command segments. In some examples, the commands decomposed by decomposition module 38 may correspond to requests received from one or more other components of controller 8, such as write module 24 or read module 28, to cause one or more of memory devices 16 to perform an operation. As discussed above, each segment of the plurality of command segments may be a type of command segment. Some example types of command segments include, but are not limited to a chip enable (CE) segment, a command (CMD) segment, an address (ADR) segment, a data write (DW) segment, and a data read (DR) segment. Regardless of the type of command segment, decomposition module 38 may output the command segments to validation module 40.

In some examples, scheduling module 30 may include delay values 42 which may specify a plurality of delay values that may each indicate a respective minimum amount of time between times at which the controller may output various combinations of the plurality of types of command segments. As one example, a first delay value may indicate a minimum amount of time between a time at which controller 8 outputs a CE segment and a time at which controller 8 may output a CMD segment. Some example values which may be included in delay values 42 are provided in Table (1), below. The values of Table (1) each indicate a number of clock cycles (i.e., cycles of a clock within controller 8). As discussed above, while the interface between controller 8 and memory devices 16 may be un-clocked, controller 8 may include an internal clock. For instance, the delay value of 4'h4 from CE segment to CMD segment may indicate that controller 8 should wait four clock cycles between a time at which controller 8 outputs a CE segment and a time at which controller 8 may output a CMD segment.

TABLE (1)

| | | Until: | | | | |
|---|---|---|---|---|---|---|
| | | CE | CMD | ADR | DW | DR |
| From: | CE | 4'h4 | 4'h4 | 4'h4 | 4'h4 | 4'h4 |
| | CMD | 4'h1 | 4'h4 | 4'h4 | 4'h6 | 4'h6 |
| | ADR | 4'h1 | 4'h4 | 4'h4 | 4'h6 | 4'h6 |
| | DW | 4'h8 | 4'h8 | 4'h8 | 4'h0 | 4'hF |
| | DR | 4'h8 | 4'h8 | 4'h8 | 4'hF | 4'h0 |

In some examples, scheduling module 30 may include validation module 40 which may be configured to determine whether a command segment of a particular type of command segments may be output (e.g., to memory devices 16) at a current time. In accordance with one or more techniques of this disclosure, validation module 40 may determine whether a command segment of a particular type of command segments may be output based on values of timers 36 received from timer module 35 and delay values 42. For instance, validation module 40 may determine a plurality of delay values 42 that each indicate a respective minimum amount of time between a time at which controller 8 outputs a command segment of a respective type of command segment of the plurality of types of command segments and a time at which controller 8 may output the particular type of command segment without committing a timing violation. Validation module 40 may determine that the command segment of the particular type of command segment may be output at the current time where a value of each respective timer of timers 36 satisfies a corresponding delay value of the plurality determined of delay values. Similarly, validation module 40 may determine that the command segment of the particular type of command segments may not be output at the current time where a value of at least one timer of timers 36 does not satisfy the corresponding delay value of the plurality of delay values. In some examples, validation module 40 may determine that a value of a corresponding timer satisfies a particular delay value where the value of the corresponding timer is greater than or equal to the particular delay value. In some examples, validation module 40 may determine that a value of a corresponding timer satisfies a particular delay value where the value of the corresponding timer is greater than the particular delay value.

Where validation module 40 determines that the command segment of the particular type of command segments may be output at the current time, validation module 40 may permit output of the command segment of the particular type of command segments to memory devices 16 at the current time. For instance, validation module 40 may cause a channel controller of channel controllers 32 to output signals corresponding to the command segment of the particular type of command segments to memory devices 16.

Where validation module 40 determines that the command segment of the particular type of command segments may not be output at the current time, validation module 40 may delay output of the command segment of the particular type of command segments. For instance, validation module 40 may delay output of the command segment of the particular type of command segments until a value of each respective timer of the plurality of timers 36 satisfies the corresponding delay value of the plurality of delay values 41. Once the value of each respective timer of the plurality of timers satisfies the corresponding delay value of the plurality of delay values 42, validation module 40 may cause a channel controller of channel controllers 32 to output signals corresponding to the command segment of the particular type of command segment to memory devices 16. In this way, validation module 40 may enable controller 8 to output signals to memory devices 16 without committing a timing violation.

Figure 4:
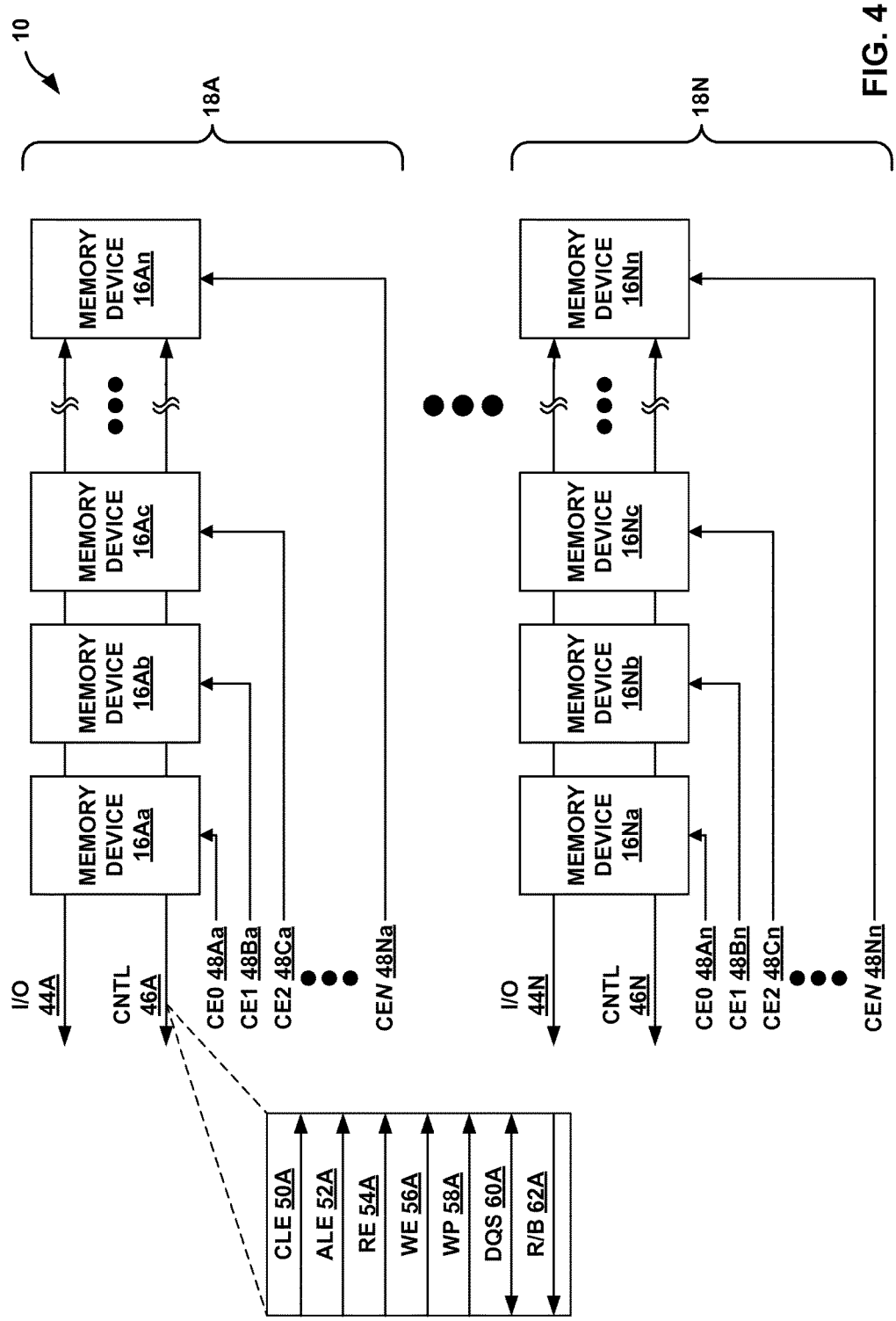
FIG. 4 is a conceptual and schematic diagram illustrating further details of an example non-volatile memory array of FIG. 1, in accordance with one or more techniques of this disclosure.

FIG. 4 is a conceptual and schematic diagram illustrating further details of an example non-volatile memory array 10 of FIG. 1, in accordance with one or more techniques of this disclosure. As discussed above, memory devices 16 may be grouped into channels 18 and the memory devices of memory devices 16 on each channel may share one or more connections to controller 8. For instance, the memory devices 16 grouped into a respective common channel of channels 18 may be attached to a respective common I/O bus of I/O buses 44A-44N (collectively, "I/O buses 44") and a respective common control bus of control busses 46A-46N (collectively, "control buses 46"). As illustrated in FIG. 4, memory devices 16Aa-16An of channel 18A may each be attached to I/O bus 44A and control bus 46A.

In some examples, each respective I/O bus of I/O buses 44 may include a plurality of bidirectional I/O lines (e.g., 8 lines, 16 lines, etc.) that may be used to exchange address information, data, and instruction information between controller 8 and memory devices 16 attached to the respective I/O bus. In some examples, each respective control bus of control buses 46 may include a plurality of lines that may be used to exchange control signals, and status information between controller 8 and memory devices 16 attached to the respective control bus. As illustrated in FIG. 4, an example control bus of control buses 46 may include a command latch enable (CLE) line 50A, an address latch enable (ALE) line 52A, a read-enable (RE) line 54A, a write-enable (WE) line 56A, and a write-protect (WP) line 58A that may be used by controller 8 to send commands to a memory device of memory devices 16; a data strobe (DQS) line 60A that may be used by either controller 8 or memory devices 16 to indicate that the data on an I/O bus is valid; and a ready/busy (R/B) line 62A that may be used by a memory device of memory devices 16 to send status information to controller 8.

As discussed above, each of channels 18 may include a set of chip enable (CE) lines which may be used to multiplex memory devices on each channel. For example, as illustrated in FIG. 4, CE lines 48Aa-48Na may be used to multiplex memory devices 16Aa-16An of channel 18A. For instance, to send a message to memory device 16Aa, controller 8 may send a signal via CE0 48Aa that causes memory device 16Aa to "listen" to one or both of the signals on I/O bus 44A and the signals on control bus 46A. Controller 8 may then issue a command to memory device 16Aa by outputting signals on one or both of I/O bus 44A and control bus 46A. In this way, controller 8 may multiplex memory devices of memory devices 16 within a particular channel of channels 18.

Figure 5:
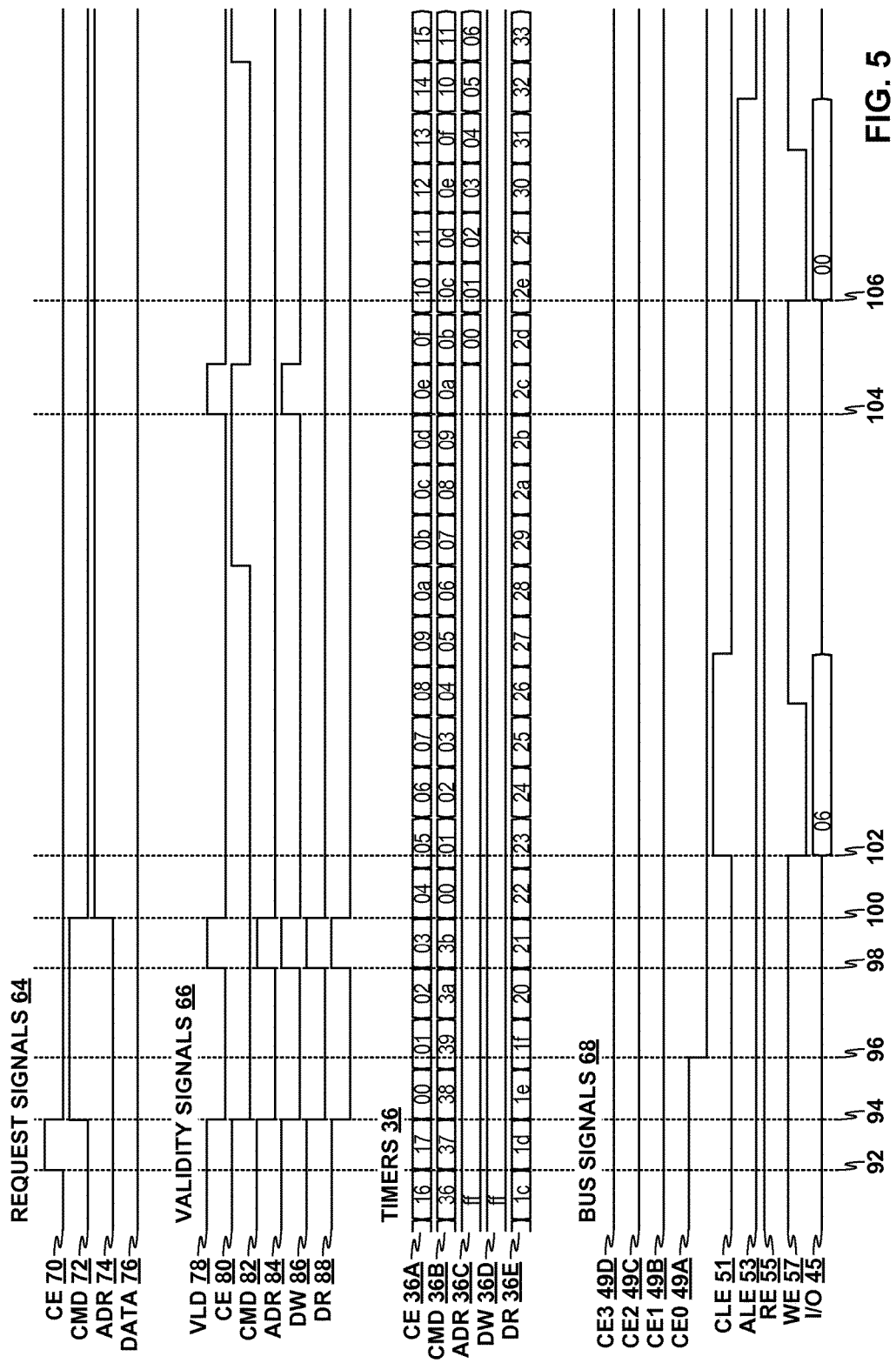
FIG. 5 is a graph illustrating exemplary signals of an example storage device, in accordance with one or more techniques of this disclosure.

FIG. 5 is a graph illustrating exemplary signals of an example storage device, in accordance with one or more techniques of this disclosure. The signals of FIG. 5 will be described with concurrent reference to storage device 6 of FIG. 1, controller 8 of FIG. 1 and FIG. 2, scheduling module 30 of FIG. 2 and FIG. 3, and NVMA 10 of FIG. 1 and FIG. 4 for ease of description, although storage devices having configurations different than that of storage device 6 and controller 8 may utilize the signals of FIG. 5. As illustrated in FIG. 5, the signals of storage device 6 may include request signals 64, validity signals 66, timers 36, and bus signals 68. Each of the signals illustrated in FIG. 5 is shown on a common time scale based on cycles (e.g., cycles of a clock of controller 8).

In some examples, request signals 64 may represent requests received by scheduling module 30 to schedule performance of operations by memory devices 16. As one example, CE request signal 70 may represent when scheduling module 30 receives a request to change the chip enable signals (i.e., to select a particular memory device of memory devices 16 from within a particular channel of channels 18). As another example, CMD request signal 72 may represent when scheduling module 30 receives a request to perform a command operation (i.e., to output a command to a memory device of memory devices 16). As another example, ADR request signal 74 may represent when scheduling module 30 receives a request to perform an address operation (i.e., to output an address to a memory device of memory devices 16). As another example, DATA request signal 76 may represent when scheduling module 30 receives a request to perform a data transfer operation (i.e., either to output data to or receive data from a memory device of memory devices 16).

In some examples, timers 36 may represent the values of a plurality of timers maintained by timer module 35 of scheduling module 30. As discussed above, the values of timers 36 may each indicate an amount of time elapsed since controller 8 last output a command segment of a respective type of command segment to one or more of memory devices 16. As illustrated by FIG. 5, each of the values of timers 36 may indicate a number of clock cycles (i.e., cycles of a clock within controller 8) since validation module 40 last permitted output a command segment of a respective type of command segments to one or more of memory devices 16.

In some examples, validity signals 66 may represent signals determined by validation module 40 of scheduling module 40. In some examples, validity signals 66 may include a plurality of respective check signals that each indicates whether a command segment of a respective type of command segments may be output at a current time. For example, CE check signal 80 may indicate whether a CE type of command segment may be output at the current time, CMD check signal 82 may indicate whether a CMD type of command segment may be output at the current time, ADR check signal 84 may indicate whether an ADR type of command segment may be output at the current time, DW check signal 86 may indicate whether a DW type of command segment may be output at the current time, and DR check signal 88 may indicate whether a DR type of command segment may be output at the current time. In some examples, validation module 40 may generate each of the plurality of respective check signals by determining whether a value of each respective timer of timers 36 satisfies a corresponding delay value of a plurality of delay values. In some examples, validation module 40 may generate a check signal of the plurality of check signals when determining whether a corresponding type of command segment may be output. In some examples, as opposed to generating CE check signal 80 when determining whether a CE type of command segment may be output at a current time, validation module 40 may substantially continuously determine the plurality of check signals, including CE check signal 80.

In some examples, validity signals 66 may include valid signal 78 which may indicate whether or not a current type of command segment may be output to memory devices 16 at a current time. As one example, where the current type of command segment is a CE type of command segment, valid signal 78 may indicate that a CE type of command segment may be output to memory devices 16 at a current time based on CE check signal 80.

In some examples, bus signals 68 may represent signals exchanged between controller 8 and memory devices 16. For instance, chip enable (CE) signals 49A-49D may represent the signals on CE lines 48, command latch enable (CLE) signal 51 may represent the signal on a respective CLE line of CLE lines 50, address latch enable (ALE) signal 53 may represent the signal on a respective ALE line of ALE lines 52, read-enable (RE) signal 55 may represent the signal on a respective RE line of RE lines 54, write-enable (WE) signal 57 may represent the signal on a respective WE line of WE lines 56, and input/output (I/O) signals 45 may represent the signals on a respective I/O bus of I/O busses 44.

As discussed above and in accordance with one or more techniques of this disclosure, as opposed to using a predetermined implementation-specific communication protocol, controller 8 may generate a communication protocol in real time. For instance, as opposed to using a predetermined implementation-specific communication protocol that specifies a static timing protocol for each command and a universal delay time between commands, scheduling module 30 may decompose the commands into a plurality of command segments and generate a communication protocol that complies with the signal timing requirements on the command segment level.

As illustrated by the example of FIG. 5, in operation, scheduling module 30 may receive a request to change chip enable lines 48 at time 92. In some examples, decomposition module 38 may decompose the request into a CE type of command segment. Validation module 40 may determine whether a CE type of command segment may be output at time 94. For instance, validation module 40 may determine a plurality of delay values that each indicate a respective minimum amount of time between a time at which controller 8 outputs a command segment of a respective type of command segment of a plurality of types of command segments and a time at which controller 8 may output a CE type of command segment. For instance, validation module 40 may determine:

a first delay value of delay values 42 that indicates a minimum amount of time between a time at which controller 8 outputs a CE type of command segment and a time at which controller 8 may output a CE type of command segment, a second delay value of delay values 42 that indicates a minimum amount of time between a time at which controller 8 outputs a CMD type of command segment and a time at which controller 8 may output a CE type of command segment, a third delay value of delay values 42 that indicates a minimum amount of time between a time at which controller 8 outputs an ADR type of command segment and a time at which controller 8 may output a CE type of command segment, a fourth delay value of delay values 42 that indicates a minimum amount of time between a time at which controller 8 outputs a DW type of command segment and a time at which controller 8 may output a CE type of command segment, and a fifth delay value of delay values 42 that indicates a minimum amount of time between a time at which controller 8 outputs a DR type of command segment and a time at which controller 8 may output a CE type of command segment.

Validation module 40 may determine CE check signal 80 by comparing the determined delay values to values of corresponding timers 36. For instance, validation module 40 may generate CE check signal 80 to indicate that a CE type of command segment may be output at the current time where a value of CE timer 36A satisfies the first delay value, a value of CMD timer 36B satisfies the second delay value, a value of ADR timer 36C satisfies the third delay value, a value of DW timer 36D satisfies the fourth delay value, and a value of DR timer 36E satisfies than the fifth delay value. In some examples, validation module 40 may determine that a value of a corresponding timer satisfies a particular delay value where the value of the corresponding timer is greater than or equal to the particular delay value. In some examples, validation module 40 may determine that a value of a corresponding timer satisfies a particular delay value where the value of the corresponding timer is greater than the particular delay value.

As illustrated in FIG. 5, validation module 40 may generate CE check signal 80 to indicate that a CE type of command segment may be output at time 92. FIG. 5 shows CE check signal 80 high at time 92 (and prior), indicating that a CE type of command segment may be output. As the current type of command segment to be output is a CE type of command segment, validation module 40 may generate valid signal 78 to indicate that the current type of command segment may be output at time 92.

Responsive to determining that the current type of command segment may be output, validation module 40 may permit output of the current command segment. For instance, validation module 40 may cause a channel controller of channel controllers 32 that corresponds to a memory device of memory devices 16 identified by the request received by scheduling module 30 to output signals corresponding to a CE type of command segment. In some examples, there may be a delay from when validation module 40 permits the channel controller to output the signals until the channel controller actually outputs the signals (e.g., due to a pipeline implemented by the channel controller). As illustrated in FIG. 5, the channel controller may output the signals corresponding to the CE type of command segment at time 96 (i.e., by transitioning CEO 49A from logical high to logical low).

Additionally, as illustrated in FIG. 5, scheduling module 30 may receive a request to perform a command operation at time 94. In some examples, decomposition module 38 may decompose the request into a CMD type of command segment and validation module 40 may determine whether a CMD type of command segment may be output at time 94. As discussed above, validation module 40 may determine a plurality of delay values that each indicate a respective minimum amount of time between a time at which controller 8 outputs a command segment of a respective type of command segment of a plurality of types of command segments and a time at which controller 8 may output a CMD type of command segment. For instance, validation module 40 may determine:

a first delay value of delay values 42 that indicates a minimum amount of time between a time at which controller 8 outputs a CE type of command segment and a time at which controller 8 may output a CMD type of command segment, a second delay value of delay values 42 that indicates a minimum amount of time between a time at which controller 8 outputs a CMD type of command segment and a time at which controller 8 may output a CMD type of command segment, a third delay value of delay values 42 that indicates a minimum amount of time between a time at which controller 8 outputs an ADR type of command segment and a time at which controller 8 may output a CMD type of command segment, a fourth delay value of delay values 42 that indicates a minimum amount of time between a time at which controller 8 outputs a DW type of command segment and a time at which controller 8 may output a CMD type of command segment, and a fifth delay value of delay values 42 that indicates a minimum amount of time between a time at which controller 8 outputs a DR type of command segment and a time at which controller 8 may output a CMD type of command segment.

Validation module 40 may determine CMD check signal 82 by comparing the determined delay values to values of corresponding timers 36. For instance, validation module 40 may generate CMD check signal 82 to indicate that a CMD type of command segment may be output at the current time where a value of CE timer 36A satisfies the first delay value, a value of CMD timer 36B satisfies the second delay value, a value of ADR timer 36C satisfies the third delay value, a value of DW timer 36D satisfies the fourth delay value, and a value of DR timer 36E satisfies than the fifth delay value.

In the example of FIG. 5, it may be a signal timing violation for controller 8 to output a CMD type of command segment at time 94. For instance, the value of CE timer 36A may not satisfy the first delay value (e.g., 8' h 03) because time 94 may be too close to time 92 (i.e., the time at which validation module 40 permitted output of a CE type of command segment). As illustrated in FIG. 5, validation module 40 may generate CMD check signal 82 to indicate that a CMD type of command segment may not be output at time 94 (e.g., CMD check signal 82 is low in FIG. 5 at time 94). As the current type of command segment is a CMD type of command segment, validation module 40 may generate valid signal 78 as low to indicate that the current type of command segment may not be output at time 94.

Responsive to determining that the current type of command segment may not be output at time 94 (i.e., the current time), validation module 40 may delay output of the current type of command segment until valid signal 78 indicates that the current type of command segment may be output. As illustrated in FIG. 5, valid signal 78 may indicate that the current type of command segment may be output at time 98 (valid signal 78 is high at time 98).

Responsive to determining that the current type of command segment may be output, validation module 40 may permit output of current command segment. For instance, validation module 40 may cause a channel controller of channel controllers 32 that corresponds to a memory device of memory devices 16 identified by the request received by scheduling module 32 to output signals corresponding to a CMD type of command segment. As discussed above, there may be a delay from when validation module 40 permits the channel controller to output the signals until the channel controller actually outputs the signals. As illustrated in FIG. 5, the channel controller may output the signals corresponding to the CMD type of command segment at time 102 (i.e., by transitioning CLE 51 from logical low to logical high, transitioning WE 57 from logical high to logical low, and outputting a command using I/O signals 45).

In any case, as illustrated in FIG. 5, scheduling module 30 may receive a request to perform an address operation at time 100. In some examples, decomposition module 38 may decompose the request into an ADR type of command segment and validation module 40 may determine whether an ADR type of command segment may be output at time 100. As discussed above, validation module 40 may determine a plurality of delay values that each indicate a respective minimum amount of time between a time at which controller 8 outputs a command segment of a respective type of command segment of a plurality of types of command segments and a time at which controller 8 may output an ADR type of command segment. For instance, validation module 40 may determine:

a first delay value of delay values 42 that indicates a minimum amount of time between a time at which controller 8 outputs a CE type of command segment and a time at which controller 8 may output an ADR type of command segment, a second delay value of delay values 42 that indicates a minimum amount of time between a time at which controller 8 outputs a CMD type of command segment and a time at which controller 8 may output an ADR type of command segment, a third delay value of delay values 42 that indicates a minimum amount of time between a time at which controller 8 outputs an ADR type of command segment and a time at which controller 8 may output an ADR type of command segment, a fourth delay value of delay values 42 that indicates a minimum amount of time between a time at which controller 8 outputs a DW type of command segment and a time at which controller 8 may output an ADR type of command segment, and a fifth delay value of delay values 42 that indicates a minimum amount of time between a time at which controller 8 outputs a DR type of command segment and a time at which controller 8 may output an ADR type of command segment.

Validation module 40 may determine ADR check signal 84 by comparing the determined delay values to values of corresponding timers 36. For instance, validation module 40 may generate ADR check signal 84 to indicate that an ADR type of command segment may be output at the current time where a value of CE timer 36A satisfies the first delay value, a value of CMD timer 36B satisfies the second delay value, a value of ADR timer 36C satisfies the third delay value, a value of DW timer 36D satisfies the fourth delay value, and a value of DR timer 36E satisfies than the fifth delay value.

In the example of FIG. 5, it may be a signal timing violation for controller 8 to output an ADR type of command segment at time 100. For instance, the value of CMD timer 36B may not satisfy the second delay value because time 100 may be too close to time 98 (i.e., the time at which validation module 40 permitted output of a CMD type of command segment). As illustrated in FIG. 5, validation module 40 may generate ADR check signal 84 to indicate that an ADR type of command segment may not be output at time 100 (e.g., ADR check signal 84 is low in FIG. 5 at time 100). As the current type of command segment is an ADR type of command segment, validation module 40 may generate valid signal 78 to indicate that the current type of command segment may not be output at time 94.

Responsive to determining that the current type of command segment may not be output at time 100 (i.e., the current time), validation module 40 may delay output of the current type of command segment until valid signal 78 indicates that the current type of command segment may be output. As illustrated in FIG. 5, valid signal 78 may indicate that the current type of command segment may be output at time 104 (valid signal 78 is high at time 104).

Responsive to determining that the current type of command segment may be output, validation module 40 may permit output of current command segment. For instance, validation module 40 may cause a channel controller of channel controllers 32 that corresponds to a memory device of memory devices 16 identified by the request received by scheduling module 32 to output signals corresponding to an ADR type of command segment. As discussed above, there may be a delay from when validation module 40 permits the channel controller to output the signals until the channel controller actually outputs the signals. As illustrated in FIG. 5, the channel controller may output the signals corresponding to the ADR type of command segment at time 106 (i.e., by transitioning ALE 53 from logical low to logical high, transitioning WE 57 from logical high to logical low, and outputting an address using I/O signals 45).

In some examples, the address output using I/O signals 45 as part of the ADR command segment may correspond to the command output using I/O signals 45 as part of the CMD command segment. As one example, where the command output using I/O signals 45 as part of the CMD command segment is a read command, the address output using I/O signals 45 as part of the ADR command segment may indicate an address of the particular memory device of memory devices 16 from which data is to be read. As another example, where the command output using I/O signals 45 as part of the CMD command segment is a write command, the address output using I/O signals 45 as part of the ADR command segment may indicate an address of the particular memory device of memory devices 16 to which data is to be written.

Figure 6:
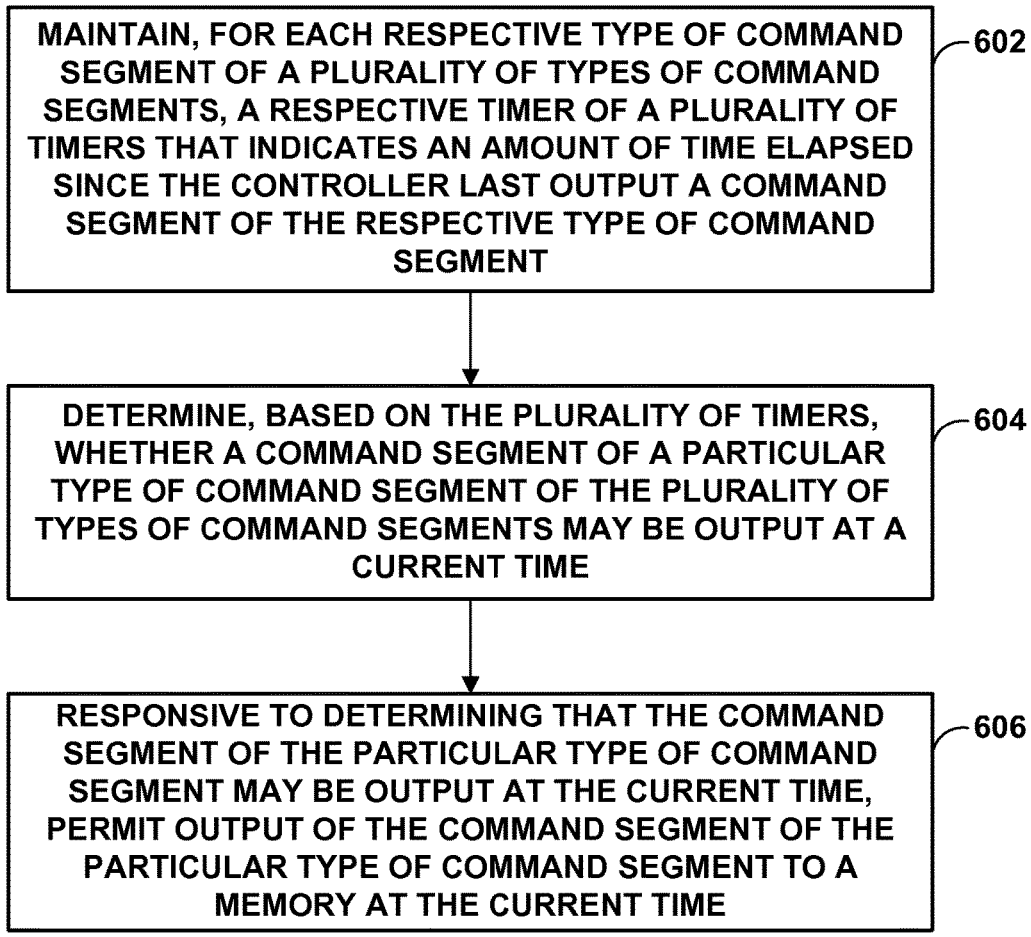
FIG. 6 is a flow diagram illustrating an example technique for generating a communication protocol in real time, in accordance with one or more techniques of this disclosure.

FIG. 6 is a flow diagram illustrating an example technique for generating a communication protocol in real time, in accordance with one or more techniques of this disclosure. The techniques of FIG. 5 will be described with concurrent reference to storage device 6 of FIG. 1, controller 8 of FIG. 1 and FIG. 2, and scheduling module 30 of FIG. 2 and FIG. 3 for ease of description, although storage devices having configurations different than that of storage device 6, controller 8, and scheduling module 30 may perform the techniques of FIG. 4.

In accordance with one or more techniques of this disclosure, controller 8 of storage device 6 may maintain, for each respective type of command segment of a plurality of types of command segments, a respective timer of a plurality of timers that indicates an amount of time elapsed since controller 8 last output a command segment of the respective type of command segment (602). For instance, timer module 35 of scheduling module of controller 8 may maintain a first timer that indicates an amount of time elapsed since scheduling module 30 last permit output a CE type of command segment, a second timer that indicates an amount of time elapsed since scheduling module 30 last permit output a CMD type of command segment, a third timer that indicates an amount of time elapsed since scheduling module 30 last permit output an ADR type of command segment, a fourth timer that indicates an amount of time elapsed since scheduling module 30 last permit output a DW type of command segment, and a fifth timer that indicates an amount of time elapsed since scheduling module 30 last permit output a DR type of command segment.

Controller 8 may determine, based on the plurality of timers, whether a command segment of a particular type of command segment of the plurality of types of command segments may be output at a current time (604). For instance, validation module 40 of scheduling module 30 may determine whether the command segment of the particular type of command segment may be output at the current time by comparing a plurality of delay values to values of the plurality of timers. In some examples, each of the plurality of delay values may indicate a respective minimum amount of time between a time at which the controller outputs a command segment of a respective type of command segment of the plurality of types of command segments and a time at which the controller may output the particular type of command segment.

In some examples, validation module 40 may determine that the command segment of the particular type of command segment may be output at the current time where a value of each respective timer of the plurality of timers satisfies a corresponding delay value of the plurality of delay values. In some examples, validation module 40 may determine that the command segment of the particular type of command segment may not be output at the current time where a value of at least one timer of the plurality of timers does not satisfy the corresponding delay value of the plurality of delay values.

In any case, responsive to determining that the command segment of the particular type of command segment may be output at the current time, controller 8 may output the command segment of the particular type of command segment to a memory device of memory devices 16 at the current time (606). For instance, validation module 40 may permit a channel controller of channel controllers 32 to output signals corresponding to the command segment of the particular type of command segment.

Responsive to determining that the command segment of the particular type of command segment may not be output at the current time, controller 8 may delay output of the command segment of the particular type of command segment until a value of each respective timer of the plurality of timers satisfies the corresponding delay value of the plurality of delay values. Once the value of each respective timer of the plurality of timers satisfies the corresponding delay value of the plurality of delay values, controller 8 may output the command segment of the particular type of command segment to the memory device of memory devices 16.

The following examples may illustrate one or more of the techniques of this disclosure.

Example 1

A data storage device comprising: a memory; and a controller configured to:

maintain, for each respective type of command segment of a plurality of types of command segments, a respective timer of a plurality of timers that indicates an amount of time elapsed since the controller last output a command segment of the respective type of command segments to the memory; determine, based on the plurality of timers, whether a command segment of a particular type of command segment of the plurality of types of command segments may be output to the memory at a current time; and responsive to determining that the command segment of the particular type of command segment may be output at the current time, permit output of the command segment of the particular type of command segment to the memory at the current time.

Example 2

The data storage device of example 1, wherein the controller is further configured to determine whether the command segment of the particular type of command segment may be output at the current time by at least: determining a plurality of delay values that each indicate a respective minimum amount of time between a time at which the controller outputs a command segment of a respective type of command segment of the plurality of types of command segments and a time at which the controller may output the particular type of command segment; determining that the command segment of the particular type of command segment may be output at the current time responsive to determining that a value of each respective timer of the plurality of timers satisfies a corresponding delay value of the plurality of delay values; and determining that the command segment of the particular type of command segment may not be output at the current time responsive to determining that a value of at least one timer of the plurality of timers does not satisfy the corresponding delay value of the plurality of delay values.

Example 3

The data storage device of any combination of examples 1-2, wherein, the controller is configured to, responsive to determining that the command segment of the particular type of command segments may not be output at the current time, delay output of the command segment of the particular type of command segment until a value of each respective timer of the plurality of timers satisfies the corresponding delay value of the plurality of delay values.

Example 4

The data storage device of any combination of examples 1-3, wherein the controller is configured to select each delay value of the plurality of delay values from a plurality of delay values that each indicate a respective minimum amount of time between times at which the controller may output various combinations of the plurality of types of command segments.

Example 5

The data storage device of any combination of examples 1-4, wherein the particular type of command segments is a second type of command segment, wherein the controller determines that the command segment of the second type of command segment may be issued at the current time, and wherein the controller is further configured to: determine, based on the plurality of timers, that a command segment of a third type of command segments of the plurality of types of command segments may not be issued at the current time.

Example 6

The data storage device of any combination of examples 1-5, wherein: the memory comprises a memory array arranged into a plurality of channels, and the controller is configured to maintain a separate plurality of timers for each respective channel of the plurality of channels.

Example 7

The data storage device of any combination of examples 1-6, wherein the plurality of types of command segments include one or more of: a chip enable (CE) segment, a command (CMD) segment, an address (ADR) segment, a data write (DW) segment, or a data read (DR) segment.

Example 8

A method comprising: maintaining, for each respective type of command segment of a plurality of types of command segments, a respective timer of a plurality of timers that indicates an amount of time elapsed since a controller of a data storage device last output a command segment of the respective type of command segment to a memory of the data storage device; determining, based on the plurality of timers, whether a command segment of a particular type of command segment of the plurality of types of command segments may be output to the memory at a current time; and responsive to determining that the command segment of the particular type of command segment may be output at the current time, permitting output of the command segment of the particular type of command segment to the memory at the current time.

Example 9

The method of example 8, wherein determining whether the command segment of the particular type of command segment may be output at the current time comprises: determining a plurality of threshold values that each indicate a respective minimum amount of time between a time at which the controller outputs a command segment of a respective type of command segment of the plurality of types of command segment and a time at which the controller may output the particular type of command segment; determining that the command segment of the particular type of command segment may be output at the current time in response to determining that a value of each respective timer of the plurality of timers satisfies a corresponding threshold value of the plurality of threshold values; and determining that the command segment of the particular type of command segment may not be output at the current time in response to determining that a value of at least one timer of the plurality of timers does not satisfy the corresponding threshold value of the plurality of threshold values.

Example 10

The method of any combination of examples 8-9, further comprising: responsive to determining that the command segment of the particular type of command segment may not be output at the current time, delaying output of the command segment of the particular type of command segment until a value of each respective timer of the plurality of timers satisfies the corresponding threshold value of the plurality of threshold values.

Example 11

The method of any combination of examples 8-10, wherein each threshold value of the plurality of threshold values is selected from a plurality of predetermined threshold values that each indicate a respective minimum amount of time between times at which the controller may issue various combinations of the plurality of types of command segments.

Example 12

The method of any combination of examples 8-11, wherein the particular type of command segments is a second type of command segments, wherein the command segment of the second type of command segments may be issued at the current time, and wherein the method further comprises: determining, based on the plurality of timers, that a command segment of a third type of command segments of the plurality of types of command segments may not be issued at the current time.

Example 13

The method of any combination of examples 8-12, wherein the memory comprises a memory array arranged into a plurality of channels, and wherein maintaining the plurality of timers comprises maintaining a separate plurality of timers for each respective channel of the plurality of channels.

Example 14

The method of any combination of examples 8-13, wherein the plurality of types of command segments include one or more of: a chip enable (CE) segment, a command (CMD) segment, an address (ADR) segment, a data write (DW) segment, or a data read (DR) segment.

Example 15

A computer-readable storage medium storing instructions that, when executed, cause a controller of a data storage device to: maintain, for each respective type of command segment of a plurality of types of command segments, a respective timer of a plurality of timers that indicates an amount of time elapsed since a controller of a data storage device last output a command segment of the respective type of command segment to a memory of the data storage device; determine, based on the plurality of timers, whether a command segment of a particular type of command segment of the plurality of types of command segments may be output to the memory at a current time; and responsive to determining that the command segment of the particular type of command segment may be output at the current time, permit output of the command segment of the particular type of command segment to the memory at the current time.

Example 16

The computer-readable storage medium of example 15, further storing instructions that, when executed, cause the controller to perform the method of any combination of examples 8-13.

Example 17

A system comprising: means for maintaining, for each respective type of command segment of a plurality of types of command segments, a respective timer of a plurality of timers that indicates an amount of time elapsed since a controller of a data storage device last output a command segment of the respective type of command segments to a memory of the data storage device; means for determining, based on the plurality of timers, whether a command segment of a particular type of command segment of the plurality of types of command segments may be output to the memory at a current time; and means for responsive to determining that the command segment of the particular type of command segment may be output at the current time, permitting output of the command segment of the particular type of command segment to the memory at the current time.

Example 18

The system of example 15, further storing instructions that, further comprising means for performing the method of any combination of examples 8-13.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A data storage device, comprising:
    a non-volatile memory array arranged into a plurality of channels; and
    a controller configured to:
        maintain, for each respective type of command segment of a plurality of types of command segments, a respective timer of a first plurality of timers that indicates an amount of time elapsed since the controller last output a command segment of the respective type of command segments to a first channel of the non-volatile memory array;
        maintain a table of delay values pertaining to an amount of time between which the controller may output commands to a validation module;
        determine through the validation module, based on the first plurality of timers and the table of delay values, whether a command segment of a particular type of command segment of the plurality of types of command segments may be output to the first channel of the non-volatile memory array at a current time; and
        responsive to determining that the command segment of the particular type of command segment may be output to the first channel of the non-volatile memory array at the current time, permit output of the command segment of the particular type of command segment to the first channel of the non-volatile memory array at the current time.

2. The data storage device of claim 1, wherein the controller is further configured to determine whether the command segment of the particular type of command segment may be output to the first channel of the non-volatile memory array at the current time by at least:
    determining a plurality of delay values that each indicate a respective minimum amount of time between a time at which the controller outputs a command segment of a respective type of command segment of the plurality of types of command segments and a time at which the controller may output the particular type of command segment to the first channel of the non-volatile memory array;
    determining that the command segment of the particular type of command segment may be output to the first channel of the non-volatile memory array at the current time responsive to determining that a value of each respective timer of the first plurality of timers satisfies a corresponding delay value of the plurality of delay values; and
    determining that the command segment of the particular type of command segment may not be output to the first channel of the non-volatile memory array at the current time responsive to determining that a value of at least one timer of the first plurality of timers does not satisfy the corresponding delay value of the plurality of delay values.

3. The data storage device of claim 2, wherein, the controller is configured to, responsive to determining that the command segment of the particular type of command segments may not be output to the first channel of the non-volatile memory array at the current time, delay output of the command segment of the particular type of command segment to the first channel of the non-volatile memory array until a value of each respective timer of the first plurality of timers satisfies the corresponding delay value of the plurality of delay values.

4. The data storage device of claim 2, wherein the controller is configured to select each delay value of the plurality of delay values from a plurality of delay values that each indicate a respective minimum amount of time between times at which the controller may output various combinations of the plurality of types of command segments.

5. The data storage device of claim 1, wherein the particular type of command segments is a second type of command segment, wherein the controller determines that the command segment of the second type of command segment may be output to the first channel of the non-volatile memory array at the current time, and wherein the controller is further configured to:
    determine, based on the first plurality of timers, that a command segment of a third type of command segments of the plurality of types of command segments may not be output at the current time.

6. The data storage device of claim 1, wherein the plurality of types of command segments include one or more of:
    a chip enable (CE) segment,
    a command (CMD) segment,
    an address (ADR) segment,
    a data write (DW) segment, or
    a data read (DR) segment.

7. The data storage device of claim 1, wherein the controller is further configured to:
    determine, based on a second plurality of timers for a second channel of the non-volatile memory array, whether a command segment of a particular type of command segment of the plurality of types of command segments may be output to a second channel of the non-volatile memory array at a current time; and
    responsive to determining that the command segment of the particular type of command segment may be output to the second channel of the non-volatile memory array at the current time, permit output of the command segment of the particular type of command segment to the second channel of the non-volatile memory array at the current time.

8. The data storage device of claim 1, wherein each channel of the plurality of channels comprises a respective plurality of non-volatile memory devices that share one or more connections to the controller, and wherein the one or more connections include a common input/output bus and a common control bus.

9. The data storage device of claim 1, wherein the controller is configured to maintain a separate plurality of timers for each respective channel of the plurality of channels.

10. A method comprising:
maintaining, for each respective type of command segment of a plurality of types of command segments, a respective timer of a first plurality of timers that indicates an amount of time elapsed since a controller of a data storage device last output a command segment of the respective type of command segment to a first channel of a plurality of channels of a non-volatile memory array of the data storage device;
maintaining a table of delay values pertaining to an amount of time between which the controller may output commands to a validation module;
determining through the validation module, based on the first plurality of timers and the table of delay values, whether a command segment of a particular type of command segment of the plurality of types of command segments may be output to the first channel of the non-volatile memory array at a current time; and
responsive to determining that the command segment of the particular type of command segment may be output at the current time, permitting output of the command segment of the particular type of command segment to the first channel of the non-volatile memory array at the current time.

11. The method of claim 10, wherein determining whether the command segment of the particular type of command segment may be output to the first channel of the non-volatile memory array at the current time comprises:
determining a plurality of threshold values that each indicate a respective minimum amount of time between a time at which the controller outputs a command segment of a respective type of command segment of the plurality of types of command segment and a time at which the controller may output the particular type of command segment to the first channel of the non-volatile memory array;
determining that the command segment of the particular type of command segment may be output to the first channel of the non-volatile memory array at the current time in response to determining that a value of each respective timer of the first plurality of timers satisfies a corresponding threshold value of the plurality of threshold values; and
determining that the command segment of the particular type of command segment may not be output to the first channel of the non-volatile memory array at the current time in response to determining that a value of at least one timer of the first plurality of timers does not satisfy the corresponding threshold value of the plurality of threshold values.

12. The method of claim 11, further comprising:
responsive to determining that the command segment of the particular type of command segment may not be output to the first channel of the non-volatile memory array at the current time, delaying output of the command segment of the particular type of command segment to the first channel of the non-volatile memory array until a value of each respective timer of the first plurality of timers satisfies the corresponding threshold value of the plurality of threshold values.

13. The method of claim 11, wherein each threshold value of the plurality of threshold values is selected from a plurality of predetermined threshold values that each indicate a respective minimum amount of time between times at which the controller may issue various combinations of the plurality of types of command segments.

14. The method of claim 10, wherein the particular type of command segments is a second type of command segments, wherein the command segment of the second type of command segments may be output to the first channel of the non-volatile memory array at the current time, and wherein the method further comprises:
determining, based on the plurality of timers, that a command segment of a third type of command segments of the plurality of types of command segments may not be output to the first channel of the non-volatile memory array at the current time.

15. The method of claim 10, wherein the plurality of types of command segments include one or more of:
a chip enable (CE) segment,
a command (CMD) segment,
an address (ADR) segment,
a data write (DW) segment, or
a data read (DR) segment.

16. The method of claim 10, wherein the controller is configured to maintain a separate plurality of timers for each respective channel of the plurality of channels.

17. A computer-readable storage medium storing instructions that, when executed, cause a controller of a data storage device to:
maintain, for each respective type of command segment of a plurality of types of command segments, a respective timer of a first plurality of timers that indicates an amount of time elapsed since a controller of a data storage device last output a command segment of the respective type of command segment to a first channel of a plurality of channels of a non-volatile memory array of the data storage device;
maintain a table of delay values pertaining to an amount of time between which the controller may output commands to a validation module;
determine through the validation module, based on the plurality of timers and the table of delay values, whether a command segment of a particular type of command segment of the plurality of types of command segments may be output to the first channel of the non-volatile memory array at a current time; and
responsive to determining that the command segment of the particular type of command segment may be output at the current time, permit output of the command segment of the particular type of command segment to the first channel of the non-volatile memory array at the current time.

18. The computer-readable storage medium of claim 17, wherein the instructions that cause the controller to determine whether the command segment of the particular type of command segment may be output to the first channel of the non-volatile memory array at the current time comprise instructions that cause the controller to:
determine a plurality of threshold values that each indicate a respective minimum amount of time between a time at which the controller outputs a command segment of a respective type of command segment of the plurality of types of command segments and a time at which the controller may output the particular type of command segment to the first channel of the non-volatile memory array;
determine that the command segment of the particular type of command segment may be output to the first channel of the non-volatile memory array at the current time in response to determining that a value of each respective timer of the first plurality of timers satisfies a corresponding threshold value of the plurality of threshold values; and determine that the command segment of the particular type of command segment may not be output to the first channel of the non-volatile memory array at the current time in response to determining that a value of at least one timer of the first plurality of timers does not satisfy the corresponding threshold value of the plurality of threshold values.

19. The computer-readable storage medium of claim 18, further comprising instructions that cause the controller to delay, responsive to determining that the command segment of the particular type of command segment may not be output to the first channel of the non-volatile memory array at the current time, output of the command segment of the particular type of command segment to the first channel of the non-volatile memory array until a value of each respective timer of the first plurality of timers satisfies the corresponding threshold value of the plurality of threshold values.

20. The computer readable storage medium of claim 17, wherein the instructions cause the controller to maintain a separate plurality of timers for each respective channel of the plurality of channels.

21. A system comprising:
means for maintaining, for each respective type of command segment of a plurality of types of command segments, a respective timer of a first plurality of timers that indicates an amount of time elapsed since a controller of a data storage device last output a command segment of the respective type of command segments to a first channel of a plurality of channels of a non-volatile memory array of the data storage device;
means for maintaining a table of delay values pertaining to an amount of time between which the controller may output commands to a validation module;
means for determining through the validation module, based on the first plurality of timers and the table of delay values, whether a command segment of a particular type of command segment of the plurality of types of command segments may be output to the first channel of the non-volatile memory array at a current time; and
means for responsive to determining that the command segment of the particular type of command segment may be output at the current time, permitting output of the command segment of the particular type of command segment to the first channel of the non-volatile memory array at the current time.

22. The system of claim 21, wherein the means for determining whether the command segment of the particular type of command segments of the plurality of types of command segment may be output to the first channel of the non-volatile memory array at the current time comprise:
means for determining a plurality of threshold values that each indicate a respective minimum amount of time between a time at which the controller outputs a command segment of a respective type of command segment of the plurality of types of command segments and a time at which the controller may output the particular type of command segment to the first channel of the non-volatile memory array;
means for determining that the command segment of the particular type of command segment may be output to the first channel of the non-volatile memory array at the current time in response to determining that a value of each respective timer of the first plurality of timers satisfies a corresponding threshold value of the plurality of threshold values; and
means for determining that the command segment of the particular type of command segment may not be output to the first channel of the non-volatile memory array at the current time in response to determining that a value of at least one timer of the first plurality of timers does not satisfy the corresponding threshold value of the plurality of threshold values.

23. The system of claim 22, further comprising:
means for delaying, responsive to determining that the command segment of the particular type of command segment may not be output to the first channel of the non-volatile memory array at the current time, output of the command segment of the particular type of command segment to the first channel of the non-volatile memory array until a value of each respective timer of the first plurality of timers satisfies the corresponding threshold value of the plurality of threshold values.

24. The system of claim 21, wherein the means for maintaining is configured to maintain a separate plurality of timers for each respective channel of the plurality of channels.

* * * * *